United States Patent Office 3,039,135
Patented June 19, 1962

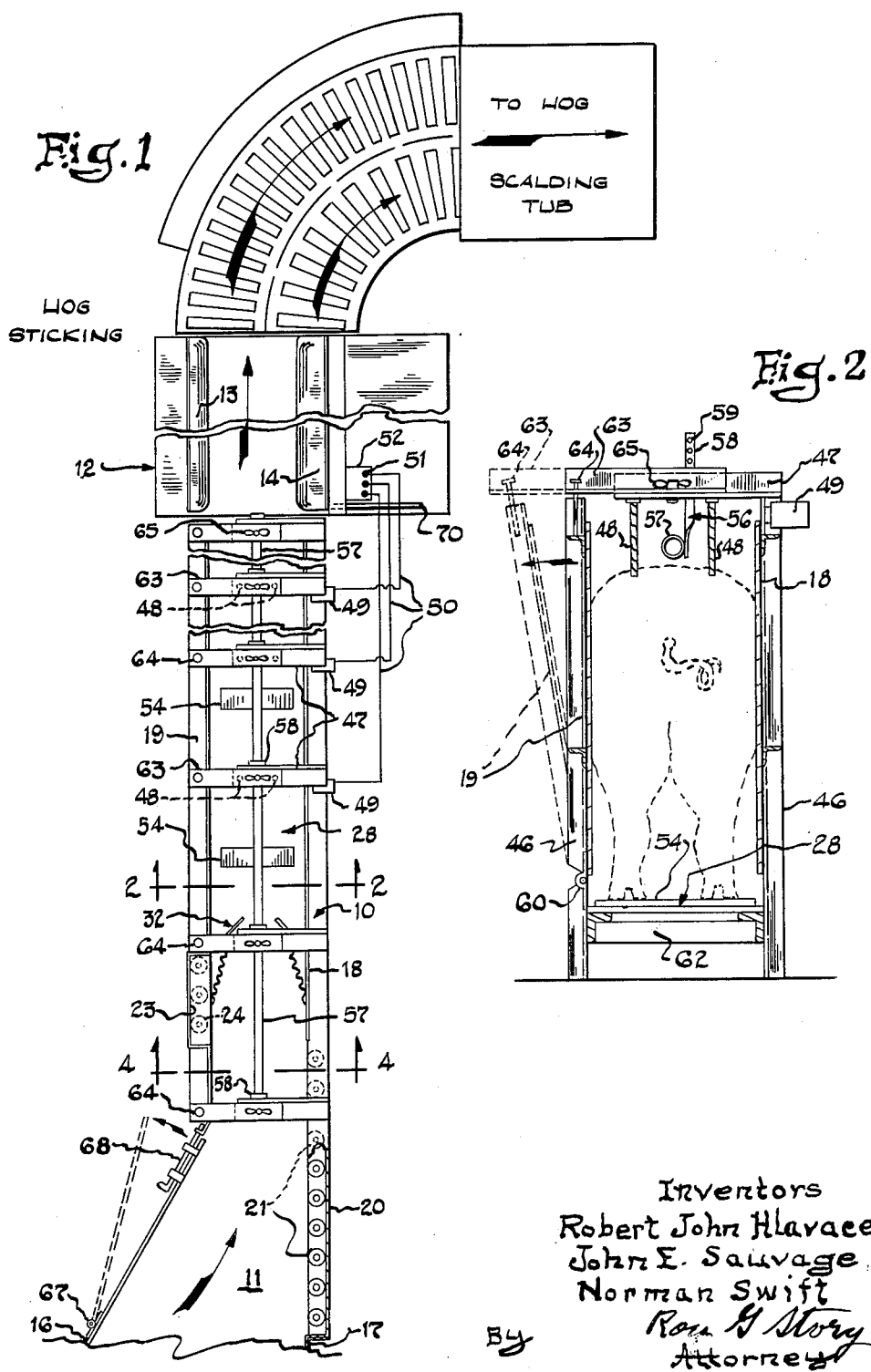

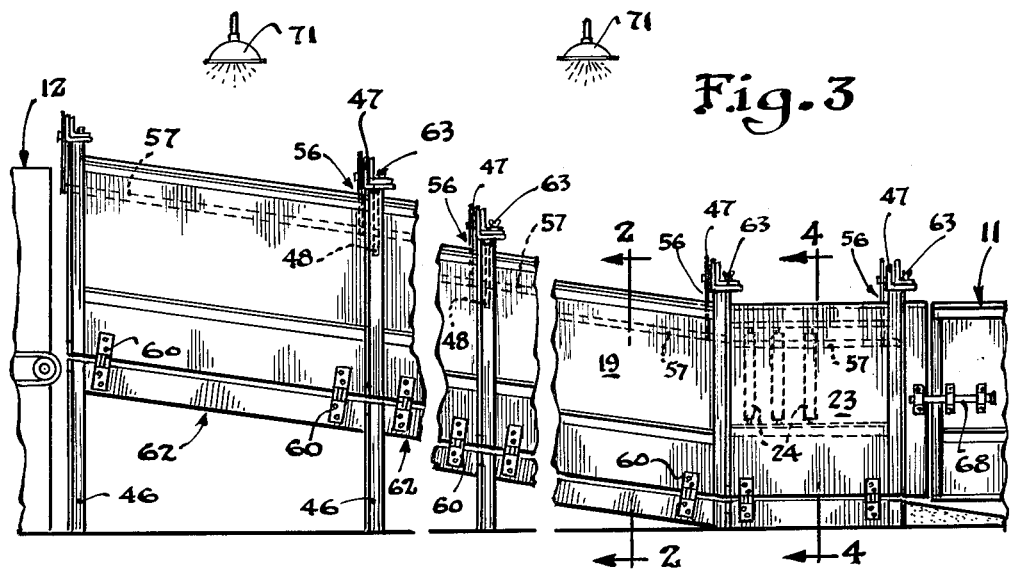
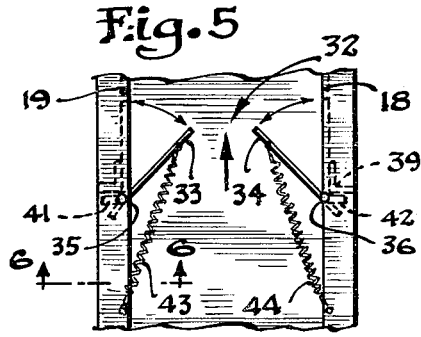
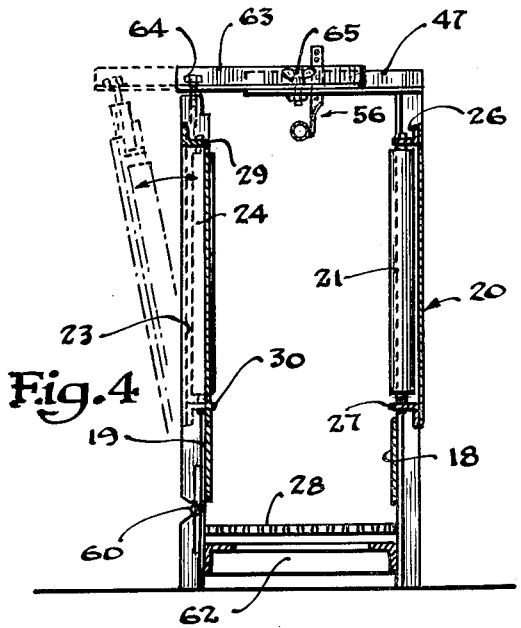
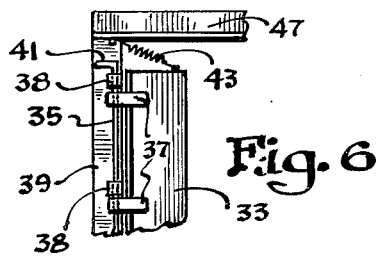
Inventors
Robert John Hlavacek
John E. Sauvage
Norman Swift
By K.S. Story
Attorney

3,039,135
ANIMAL RUNWAYS
Robert John Hlavacek, Clarendon Hills, John E. Sauvage, Chicago, and Norman Swift, Oak Lawn, Ill., assignors to Swift & Company, Chicago, Ill., a corporation of Illinois
Filed Aug. 12, 1959, Ser. No. 833,290
8 Claims. (Cl. 17—1)

This invention generally involves apparatus for reassembling a group of animals into single file. More specifically this invention is directed to improvements in animal runways for urging a plurality of animals, single file, in a given direction.

It is usually necessary in packing houses to drive animals from holding pens into smaller restraining pens wherein each animal is rendered unconscious or otherwise operated upon in a slaughtering operation. For this purpose, one or more runways are provided along which the animals must pass, each running to a separate pen. Generally, these runways are only wide enough to pass a single animal. However, since they must be constructed to accommodate a wide range of animal sizes, it sometimes occurs that two small animals can come abreast of one another in the runway. Sometimes the smaller animals even wedge themselves so as to prevent further forward movement. Also it has been observed that animals tend to jam up within the holding pen at the entrance to the usual animal runway and prevent entry thereto.

The usual runway requires the attention of an attendant who, by slapping and jabbing the animals with a cane or the like, forces the animals to enter the runway in single file, and then keeps them moving forwardly to the restraining pen. Often the attendant must also manually prevent animals from entering the restraining pen during the time that the preceding animal is being either stunned or slaughtered. It has been observed that if an animal senses the dangers in the restraining pen it will balk and attempt to back up or climb over the sides of the runway. Therefore, in the past it has also been a requirement of the attendant to force balking animals forward and also to be alert and prevent any animals from jumping from the runway.

Accordingly, it is a primary object of this invention to provide an apparatus wherein animals may easily move from a group into single file.

Another object of this invention is to provide apparatus for assisting the movement of animals from a holding pen to a runway in single file.

It is still another object of this invention to provide apparatus for urging animals to move forward in single file under their own power.

It is a further object of this invention to provide apparatus wherein animals may be urged forwardly along a runway by an operator remotely located with respect to the runway.

These and other objects are accomplished in our apparatus which includes a relatively narrow chute or runway extending from an animal holding pen. One side of the runway extends substantially co-extensive from a side of the holding pen. A friction-reducing means is located along this side running from a point within the holding pen to a point a short distance within the runway. Additionally a second friction-reducing means may be located on the opposite side of the runway but does not extend into the holding pen area. Both sides of the runway are formed of a continuous sheet material so as to present a relatively smooth, unbroken surface defining the path which the animal must take. One side of the runway is movable transversely so that the width of the runway may be adjusted to accommodate animals of various sizes. Immediately downstream (in the direction of animal movement) of the friction-reducing means is located a one-way trap gate, openable only in the direction of movement, which, when closed, only partially obstructs the passageway so as to allow an animal upstream thereof to see beyond the gate. The runway is also divided into zones of convenient length containing electric shock means, energizable from a location remote from the runway. The electric shock means engages each animal passing through the zone and, when energized, will apply a small electric shock sufficient to cause the animal to move forwardly from the zone.

Additional objects and advantages of our invention will become apparent upon reading the specification in conjunction with the drawings wherein:

FIGURE 1 is a plan view with parts broken away of the improved animal runway leading to a restraining device;

FIGURE 2 is a sectional elevation on an enlarged scale taken at line 2—2 in FIGURES 1 and 3, showing a hog moving through the runway;

FIGURE 3 is an elevation of the apparatus of FIGURE 1;

FIGURE 4 is a sectional elevation of the runway taken at line 4—4 in FIGURES 1 and 3;

FIGURE 5 is a detailed plan view with part of the structure removed of a portion of the apparatus of FIGURE 1 showing the one-way gate; and FIGURE 6 is a detailed elevation view taken at line 6—6 in FIGURE 5.

Referring to the figures, it may be seen that the runway generally indicated at 10 extends from a holding pen generally 11 to a restraining device generally 12. For purposes of illustration, the restraining device is shown to include two movable cushions 13, 14, which may be caused to engage an animal therebetween. The details of the holding pen form no part of this invention and are covered in a separate copending application for U.S. Letters Patent.

It may be seen in FIGURE 1 that the holding pen 11 is connected to the runway by a pair of converging walls 16, 17. One side of the runway 10 is coextensive with wall 17 of the holding pen. The opposite, parallel side 19 of the runway is at an angle but continuous with wall 16 of holding pen 11.

Directly opposite the juncture of side 19 and wall 16 and for some distances to either side thereof, a continuous section of side 18 and wall 17 is recessed at 20 to provide for a plurality of rollers 21. In this regard it is intended that the wall 17, defining the pen 11, be considered as extending to a point directly opposite the aforementioned juncture, and beyond that point the contiguous side structure is considered as the side 18 of the runway. The recess 20 extends a short distance along side 18 into the runway and back along wall 17 a substantial distance into the holding pen 11. The rollers 21 form a friction reducing means enabling individual animals to pass easily from the holding pen 11 into runway 10. Similarly, a short portion of side 19, immediately downstream (in the direction of animal movement) from a point opposite recess 20, is recessed at 23 to provide for a plurality of rollers 24. As may be seen in FIGURE 4, rollers 21 are journaled in a flange 26 at the top of side 18, and similarly in a flange 27 located a short distance above the floor 28 of runway 10. Similarly rollers 24 are journaled in a pair of flanges 29, 30, set in recess 23 at elevations corresponding to flanges 26, 27.

Immediately downstream of rollers 24 are a pair of hinged, one-way gates generally indicated at 32 in FIG- URE 1. The gates 32 may be seen in greater detail in FIGURES 5 and 6. Each gate comprises a rectangular plate 33, 34, rigidly connected to vertical shafts 35, 36, respectively, by means of a plurality of metal straps 37. Plates 33, 34, may be of metal, wood, or other similar solid material, with straps 37 secured thereto by welding, brazing, or bolting, etc. The straps 37 are also rigidly fixed to shafts 35, 36, in a similar manner. Shafts 35, 36, in turn are rotatably supported in eyes 38 secured to sides 18 and 19, preferably on vertical frame members 39. The tops of shafts 35, 36, are bent at right angles to form crank pieces 41, 42, respectively. The latter are also disposed at an angle to plates 33, 34, respectively, and butt against the vertical frame members 39 so as to limit the inward movement of the plates. As may be seen in the drawings, plates 33, 34, are limited to move inwardly through an angle less than 90 degrees so as to leave an opening through which animals may see ahead. Tension springs 43, 44, are secured to the upper edge of plates 33, 34, and to the sides 19 and 18, respectively, to normally urge the gates inwardly toward the closed position.

The remaining portion of the runway 10 between gates 32 and the restraining device 12 is divided into a plurality of zones of approximately 2 to 4 feet in length. Additionally, this part of the runway 10 is usually inclined upwardly (as may be seen in FIGURE 3) to an elevated restraining device 12. (However, it is to be understood that the invention applies equally to level and downwardly inclined runways.) The inclined runway 10 is supported by a plurality of vertical frame members 46. Upper horizontal cross members 47 are supported from the vertical frame members 39 and 46 along side 18. One or more of a cross member 47 usually extend transversely above each zone of runway 10. Hanging from at least one cross member 47 in each zone are a plurality of electrical conductors 48. The latter are preferably light metal chains hanging downwardly a sufficient distance to come into contact with animals moving along the runway 10. It has been found preferable to employ at least one pair of transversely spaced electrical conductors 48 in each zone. The conductors 48 are insulated from the cross members 47 and are electrically connected by means of wires (not shown) with individual induction coils 49.

The induction coils 49 (which may be regular automotive spark coils) are located adjacent side 18 and usually fastened to vertical frame members 46. The coils 49 in turn are connected by separate wires 50 to energizing switches 51 in a control panel 52. All of the switches 51 in turn are connected in parallel, with a source of electric current (not shown) which in turn is placed in a series with a common ground. The common ground must be some portion of runway 10 which normally comes into contact with the animals moving therethrough. This may be either side 18 or 19, if the latter are formed substantially of metal; although the common ground is preferably the floor 28 of runway 10. It is not necessary that the floor be constructed entirely of metal; however, a substantial area thereof, usually in the form of separated grounding strips 54 along floor 28 must be provided. The remainder of the floor may be of wood or the like and will usually be sufficient to pass high potential electric current flowing through the animals from conductors 48 to the grounding strips 54. The fact that floor 28 is usually damp probably makes it sufficiently conductive. However, as a general requirement, the induction coil 49 should preferably develop about 5,000–10,000 volts potential which is usually sufficient to provide a spark capable of jumping approximately ¼ inch from conductors 48.

The control panel 52 is most conveniently located adjacent the restraining device 12. In this manner an operator may attend it while also handling restraining and stunning operations at the same time. Electrification of the zones along runway 10 in the manner described allows the attendant to selectively urge animals, within any or all of the zones, to move simply by actuating the proper switch 51 thus causing a current to pass through the animal from conductors 48 to floor 28 and grounding strip 54. It has been found that regardless of the exact position of the animal with respect to the electrical conductors 48, their normal reaction is to move forwardly. Thus it may be seen that a single operator will be able to keep animals moving forward through runway 10 from a remote location such as that adjacent the restraining device 12.

A vertically adjustable overhead member generally 56 comprising a pipe 57 supported from a plurality of strap members 58 is also secured to the overhead cross members 47. As may be seen in FIGURE 2, the strap members 58 contain a plurality of bolt holes 59 through which suitable bolts may be passed and screwed onto the cross members 47. Pipe 57 thus may be raised or lowered by suspending the assembly from corresponding bolt holes in each strap 58. The overhead member 56 is positioned in accordance with the size range of animals being processed and prevents the animals from jumping over other animals or the sides of the runway 10.

Referring to FIGURES 2, 3 and 4, it may be seen that side 19 (including the recess 23 and rollers 24 mounted therein) is hinged adjacent the floor 28 of runway 10 so as to be pivotable outwardly away from the opposite side 18. For this purpose, hinges 60 are secured at spaced locations along the lower edge of side 19 and the frame 62 of floor 28; and vertical frame members 46 along side 19 are divided into two sections at the lower edge of side 19. Accommodation for limiting the outward movement of side 19 may be provided, as illustrated in FIGURES 2 and 4, by providing each of the horizontal cross members 47 with an additional coextensive sliding member 63 to which the vertical frame members 46 along side 19 are secured by bolts 64. The position of slide 63 in turn is fixed by means of a wing-nut and bolt assembly 65, extending through corresponding slots in both cross members 47 and slides 63. A portion of wall 16 in pen 11 may also hinge vertically at 67 to swing outwardly with the side 19. In this instance latch 68 is provided to lock the hinged portion of wall 16 and side 19 together.

As may be seen in FIGURE 1, the upper end of runway 10 is provided with a gate 70 movable transversely of the runway to block animals from moving into the restraining device generally 12. In the described embodiment of the apparatus at least one cushion 13 or 14 of the restraining device 12 is moved toward the others to engage an animal therebetween. Therefore, it has been convenient to attach the gate 70 to the movable cushion 14, as shown in FIGURE 1, so that it will be automatically moved across the runway with the cushion to block succeeding animals in runway 10 when an animal is engaged within the restraining device 12. It may be noted, as shown in FIGURE 3, that the runway 10 is well lighted by means of a plurality of lamps 71 suspended directly thereover. It has been found that where animals are proceeding along a confined path, they are much calmer and show less tendency to shy or balk where the path is clearly lighted.

In operation, animals are herded into the holding pen 11 in relatively large groups. The side 19 and overhead member 56 should be adjusted to accommodate the size of the animals being processed. The natural tendency is for the animals to move forward toward the runway 10. However, the runway will be wide enough to admit animals only when in single file. Therefore, at the entrance to the runway the animals tend to jam up and wedge themselves against the walls 16, 17 of the holding pen. The friction reducing rollers 21 assist animals forced against wall 17 to more easily slip past animals along the opposite wall 16. However, when the animals along wall 16 do reach the runway entrance they will slip into the runway, between animals along wall 17, and thereafter will be assisted by the second friction reducing means comprising rollers 24 along the side 19. As each animal continues to move forward it will pass through the one-way gates 32 which, once passed, cannot be backed through.

Once past gates 32, the animal begins walking up an inclined path to the restrainer 12. Should an animal hesitate along this portion of runway 10 an operator, on observing the hesitation, notes the zone in which the animal is standing and depresses an appropriate switch 51 on control panel 52. This will energize a spark coil 49 connected with the electrical conductor members 48 hanging within the zone and in contact with the animal. The animal will thus receive a slight shock, causing him to move forward into the next zone where the action may be repeated if necessary. Upon reaching the end of runway 10 each animal will step, in turn, into the restraining device 12. When one animal is in the restrainer, gate 67 will be closed behind it to prevent the next animal from entering before the restrainer again becomes clear.

The foregoing description is for the purpose of complying with 35 USC 112, and we do not desire to be limited to the exact details shown and described, for obvious modifications will be apparent to those skilled in the art to which this most nearly appertains, and such modifications may be made without departing from the spirit of the invention.

We claim:

1. An improved animal runway extending from a holding pen or the like, said runway comprising: a floor extending from the holding pen, said floor being suitable for supporting ambulatory animals, a pair of sides extending upwardly from said floor defining the animal runway, at least one side being adjustable with respect to the other side to be spaced a distance therefrom permitting only animals in single file to pass therebetween; a plurality of flexible members hanging within the space between said sides, said flexible members being electrically conductive and longitudinally spaced at given locations above said floor so as to be successively contacted by an animal ambulating along the runway; a source of electric power of relatively high potential and relatively low current connectible to said flexible members, said source of electric power being grounded to said floor; and means to selectively connect successive flexible members to said source of electric power whereby a shock may be applied to an animal at any of said given locations to urge said animal forwardly through said runway.

2. An improved animal runway extending from a holding pen or the like, said runway comprising: a stationary floor extending from a holding pen, said floor being suitable for supporting ambulatory animals; a pair of sides extending upwardly from said floor defining an animal runway, at least one side being adjustable with respect to the other side to be spaced a distance therefrom permitting only animals in single file to pass therebetween; friction-reducing means associated with at least one of said sides and a wall of the holding pen adjacent said one side to assist the passage of individual animals from said pen along said wall and one side into said runway; and a plurality of electric conductor means spaced along said runway for selectively and individually delivering an electric shock to an animal ambulating therethrough to thereby urge said animal to move forwardly away from said pen.

3. The apparatus of claim 2 wherein the friction-reducing means comprises a plurality of rollers rotatably mounted upon said wall and said one side with the axes of said rollers substantially perpendicular to said floor.

4. An improved animal runway extending from a holding pen or the like, said runway comprising: a frame; a stationary floor supported upon said frame; a first side rigidly secured to said frame and extending upwardly adjacent one side of said floor; a second side oppositely disposed said first side adjacent said floor, said second side being movable outwardly with respect to said first side; friction reducing means associated with at least one of said sides and an immediately adjacent portion of the holding pen, said friction-reducing means assisting the passage of individual animals from said pen to between said sides along said one side; one-way means extending between said first and second sides beyond said friction-reducing means from said holding pen, said means adapted to permit animals to pass only in the direction away from the holding pen, said means also enabling animals to see forwardly into the runway when in the closed position; and a plurality of electric conductor means spaced beyond said gate from the holding pen, each of said conductor means being contactable with ambulatory animals supported on said floor between said sides and separately actuable to deliver only a nonimmobilizing shock sufficient to urge the animals forwardly.

5. An improved animal runway extending from a holding pen or the like, said runway comprising: a frame; a stationary floor supported upon said frame; a first side rigidly secured to said frame and extending upwardly adjacent one side of said floor, said first side being substantially co-extensive with a wall of the holding pen; a second side oppositely disposed said first side adjacent said floor, said second side being pivotably connected to said frame adjacent said floor and movable outwardly with respect to said first side, both said first and said second sides being constructed of a sheet material to present a substantially unbroken surface internally of said runway; a first friction-reducing means extending from a point on said wall of the holding pen to a point on said first side within the runway; a second friction-reducing means associated with said second side extending beyond said first friction-reducing means, both said friction-reducing means assisting the passage of individual animals from said pen to between said sides; a gate extending between said first and second sides beyond said friction-reducing means from the holding pen, said gate adapted to permit animals to pass only in the direction from the holding pen, said gate also enabling animals to see forwardly into the runway when in the closed position; and a plurality of electric conductor means spaced beyond said gate from the holding pen, said conductor means being contactable with ambulatory animals supported on said floor between said sides and separately actuable to deliver only a nonimmobilizing shock sufficient to urge the animals forwardly.

6. An improved animal runway extending from a holding pen or the like, said runway comprising: a frame; a floor supported upon said frame; a first side rigidly secured to said frame and extending upwardly adjacent one side of said floor, said first side being substantially co-extensive with a wall of the holding pen; a second side oppositely disposed said first side adjacent said floor, said second side being pivotably connected to said frame adjacent said floor and movable outwardly with respect to said first side, both said first and said second sides being constructed of a sheet material to present a substantially unbroken surface internally of said runway; a plurality of rollers extending from a point on said wall of the holding pen to a point on said first side within the runway; a second plurality of rollers on said second side extending from about opposite said point on said first side for a short distance away from the holding pen, both said pluralities of rollers disposed with the axes substantially perpendicular to said floor so as to assist the passage of individual animals from said pen to between said sides; a gate extending between said first and second sides beyond said second plurality of rollers from said holding pen, said gate adapted to permit animals to pass only in the direction from the holding pen, said gate also enabling animals to see forwardly into the runway when in the closed position; and a plurality of flexible electric conductors hanging between said sides beyond said rollers so as to brush against an animal moving therebetween, said conductors being disposed in pairs transverse to and spaced longitudinally along said runway; and a source of electric energy having high potential and low current connectible between pairs of said conductors and said floor whereby an animal contacting said conductors may be urged forwardly by an electric shock.

7. An improved animal runway extending from a holding pen or the like wherein the pen is defined by at least two angularly disposed walls and is substantially broader than said runway, said runway comprising: a stationary floor extending from said holding pen, said floor being suitable to support ambulatory animals; a pair of parallel sides extending upwardly from said floor defining the runway, said sides being spaced sufficiently from one another to permit one animal to enter therebetween but prevent any additional animals from entering abreast of said one animal, one of said sides being contiguous and extending in the same direction with one wall of said pen while the other side extends at an angle from another wall of said pen; and friction reducing means located on said one side and only on said one wall extending from a point within said pen to a point spaced therefrom within said runway whereby to assist successive animals to enter between said sides from along said one wall more freely than from along said other wall.

8. The apparatus of claim 7 wherein the friction reducing means comprises a plurality of rollers rotatably mounted on said wall and said one side with the axes of said rollers substantially perpendicular to said floor.

References Cited in the file of this patent
UNITED STATES PATENTS

| | | |
|---|---|---|
| 712,579 | Nicholson et al. | Nov. 4, 1902 |
| 1,857,658 | Pfretzschner | May 10, 1932 |
| 2,185,949 | Regensburger | Jan. 2, 1940 |
| 2,526,037 | Murphy | Oct. 17, 1950 |
| 2,790,416 | Klinzing | Apr. 30, 1957 |